US006590848B1

(12) United States Patent
Chen

(10) Patent No.: US 6,590,848 B1
(45) Date of Patent: Jul. 8, 2003

(54) DISK DRIVE CAGE ASSEMBLY

(75) Inventor: Chia Hua Chen, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/507,593

(22) Filed: Feb. 18, 2000

(30) Foreign Application Priority Data

Sep. 17, 1999 (TW) ..................................... 88215998 U

(51) Int. Cl.⁷ .............................................. G11B 33/02
(52) U.S. Cl. ................... 369/75.1; 361/685; 312/223.2; 174/52.1
(58) Field of Search ......................... 369/75.1; 361/685, 361/683; 312/223.2, 223.1; 174/52.1, 66; 360/97.02, 137

(56) References Cited

U.S. PATENT DOCUMENTS

| | | | | |
|---|---|---|---|---|
| 5,011,418 A | * | 4/1991 | Perzentka, Jr. | 439/135 |
| 5,067,041 A | * | 11/1991 | Cooke et al. | 361/685 |
| 5,191,544 A | * | 3/1993 | Benck et al. | 361/688 |
| 5,199,776 A | * | 4/1993 | Lin | 312/293.3 |
| 5,513,068 A | * | 4/1996 | Girard | 361/683 |
| 5,542,757 A | * | 8/1996 | Chang | 312/223.2 |
| 5,730,515 A | * | 3/1998 | Ho | 312/334.7 |
| 5,748,442 A | * | 5/1998 | Toor | 361/683 |
| 5,768,097 A | * | 6/1998 | Jelinger | 312/223.2 |
| 5,783,777 A | * | 7/1998 | Kruse et al. | 174/66 |
| 5,863,016 A | * | 1/1999 | Makwinski et al. | 248/27.1 |
| 5,986,881 A | * | 11/1999 | Yang | 361/685 |
| 6,075,694 A | * | 6/2000 | Mills et al. | 312/223.2 |
| 6,102,501 A | * | 8/2000 | Chen et al. | 312/223.2 |
| 6,122,173 A | * | 9/2000 | Felcman et al. | 312/223.1 |
| 6,166,325 A | * | 12/2000 | Wu | 174/35 GC |
| 6,278,606 B1 | * | 8/2001 | Schmitt et al. | 361/683 |
| 6,293,636 B1 | * | 9/2001 | Le et al. | 292/DIG. 37 |
| 6,362,955 B2 | * | 3/2002 | Felcman et al. | 312/223.1 |
| 6,390,320 B2 | * | 5/2002 | Hurst et al. | 220/241 |

* cited by examiner

Primary Examiner—William Korzuch
Assistant Examiner—Angel Castro
(74) Attorney, Agent, or Firm—Wei Te Chung

(57) ABSTRACT

The present invention relates to a disk drive cage assembly, and particularly to an adaptable disk drive cage assembly for a computer that is easily modifiable to selectively accommodate vertical computer front bezels or horizontal computer front bezels, and to a disk drive cage assembly having shielding for attenuating the emission of electromagnetic radiation and the like therefrom. A disk drive cage assembly in accordance with this invention has a cage defining a plurality of bays for receiving data storage devices and a front panel defining a window for the bays. In order to accommodate vertical computer front bezel and horizontal computer front bezels, a cross-section of the cage and the window are designed in the shape of a square. In order to attenuate the emission of electromagnetic radiation through the window, removable protecting patches are formed along the circumference of the window and manually removable shield members are mounted in the bays.

20 Claims, 6 Drawing Sheets

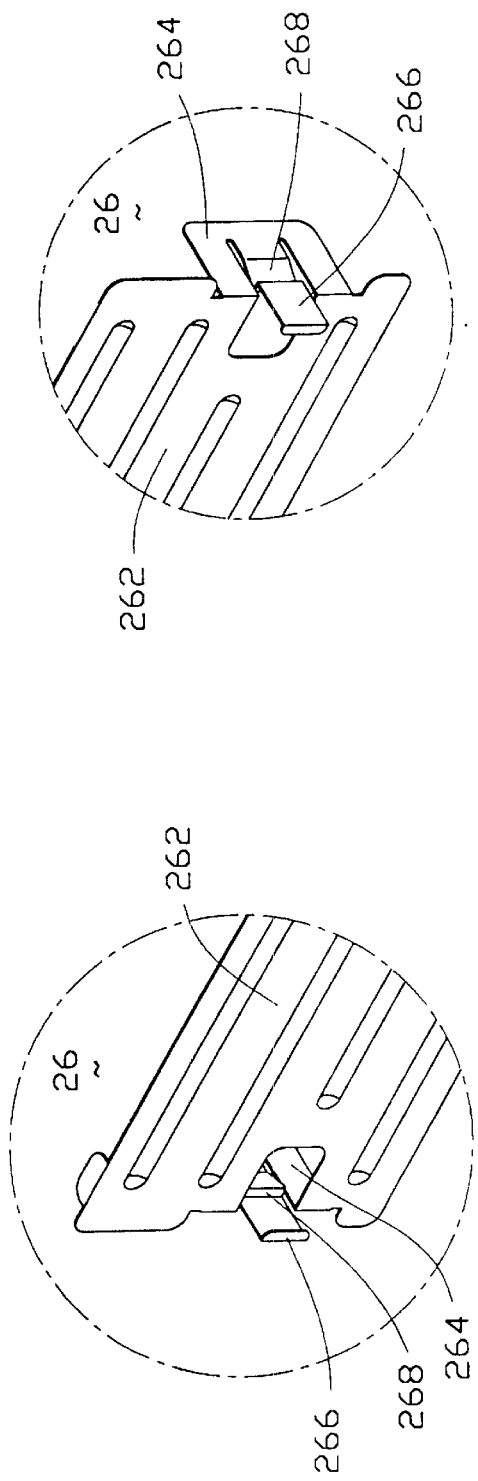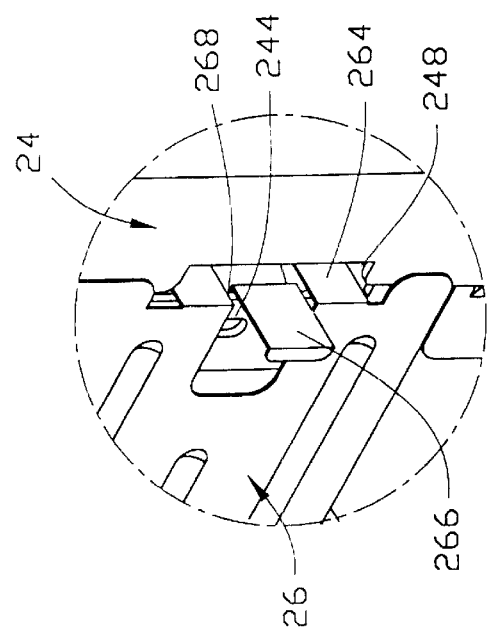
FIG. 4
FIG. 5
FIG. 6

DISK DRIVE CAGE ASSEMBLY

BACKGROUND OF THE INVENTION

1. Field of the Invention

The present invention relates to a disk drive cage assembly, and particularly to an adaptable disk drive cage assembly for a computer that is easily modifiable to selectively accommodate a vertical-type computer front bezel or a horizontal-type computer front bezel, and to a disk drive cage assembly which has shielding for preventing electromagnetic interference (EMI).

2. The Related Art

A conventional disk drive cage usually defines a plurality of bays to receive and accommodate data storage devices such as magnetic disks, optical disks, tape backups, and other drives. The bays provide flexibility for arranging such components. Since the bays are not completely configured, there are usually additional openings through which emission of electromagnetic radiation occurs and causes EMI problem. In the past, a widely used method to deal with electromagnetic radiation emission was to stamp rectangular traces on a front metal panel corresponding to openings of the bays. If any of the bays is to be inserted into a data storage device, a detachable plate portion surrounded by the rectangular traces will be removed away from the metal panel thereby forming an opening for the bay. Other detachable plate portions will be retained integral with the metal front panel as shield members when the empty bays blocked by them are not to be used. Only when the bay needed to be used to receive a data storage device could the corresponding shield member on the front panel be taken off with a tool. However, assembly using this method is inconvenient and the material of the shield member integral with the front panel is limited. Furthermore, the integral shield member can easily create harmful rough edges after it is removed from the front panel. Moreover, once the shield member is taken off, it can not be reinstalled.

Although later designed shield members made from thin sheet metal material are not originally integral with the front metal panel, such as those disclosed in Taiwan Patent Application Nos. 85207472 and 85219481, the installation of such shield members in corresponding bays is by screws, making the task cumbersome and time-consuming.

Therefore, there is a need for an improved shield member which is easily installed on the front panel without the shortcomings of the prior art.

On the other hand, as the development of computers have advanced, it has become desirable to provide compatible assemblies, such as an adaptable disk drive cage assembly for a computer that is easily modifiable to selectively accommodate a vertical computer front bezel or a horizontal computer front bezel. Many problems must be resolved for such a drive cage. A vertical-type (tower-type) computer usually can not be simply converted to a horizontal-type configuration because some electrical components, such as CD-ROMs and HDDs may not operate in a user-friendly way especially during accessing the disks or the drives when they are converted from a normally horizontal position to a vertical position. Additionally, the dimension of the CD-ROM or HDD may not match the dimension of the bays of the cage placed horizontally. FIGS. 1A to 1C shows schematic front views of conventional vertical-type and horizontal-type computer enclosures 90 and a drive 94. The computer enclosure 90 includes a disk dive cage 92 for receiving a plurality of drives 94. Suppose the width of the disk drive cage 92 is W, the height is H, and the width of the drive 94 is A, the height is B. When the computer enclosure 90 is placed vertically, W must be equal to A to horizontally receive the drive 94, while when the computer enclosure 90 is placed horizontally, H must be equal to A to horizontally receive the drive 94. Since W is equal to H, section of the drive cage must be square. Normally, the drive 94 has a specific dimension, where the width A thereof is three times of the height B thereof plus a constant 2D and meets an equation: $W=A=3B+2D$. In other words, there will be a gap D respectively at the upper and the lower edges of the cage which will allow the emission of electromagnetic radiation and cause an EMI problem.

It is requisite to provide a new disk drive cage assembly for solving the above disadvantages and problems.

SUMMARY OF THE INVENTION

With the foregoing particularly in mind, it is an object of this invention to permit enhanced flexibility in selecting and accommodating vertical computer front bezels or horizontal computer front bezels while maintaining suitable shielding against emission of electromagnetic radiation. In realizing this object of the present invention, protecting patches are integrally formed along a periphery of a disk drive cage bay window and manually removable shield members are mounted in the disk drive cage bays for decreasing the emission of electromagnetic radiation.

It is another object of the present invention to permit full EMI shielding whether the disk drive cage is assembled in a computer in a vertical or in a horizontal configuration. In realizing this object of the present invention, removable protecting patches are formed for shielding extra gaps around a drive cage bay window. The gaps are formed because the window is a little larger than a conventional drive cage so as to receive disk dives in any orientation, and are formed such that if the patches in one orientation are removed to mount disk drives, the patches in the other orientation still exist to shield the gaps.

It is another object of the present invention to enable easy and convenient installation and removal of shield members. In realizing this object of the present invention, the shield members are designed using easily operated hooked spring arms which engage the shield with the sides of a bay, making screw unnecessary.

Other objects, advantages and novel features of the invention will become more apparent from the following detailed description of a preferred embodiment thereof when taken in conjunction with the accompanying drawings, wherein:

BRIEF DESCRIPTION OF THE DRAWINGS

FIG. 4 is a partial, enlarged view of a shield member showing a hooked spring arm viewed from a first direction;

FIG. 5 is another partial, enlarged view of the shield member showing the hooked spring arm viewed from a second direction;

FIG. 6 is a partial, enlarged perspective view of the disk drive cage assembly showing the installation of the shield member to the front panel;

DETAILED DESCRIPTION OF THE PREFERRED EMBODIMENT

Figure 1B:
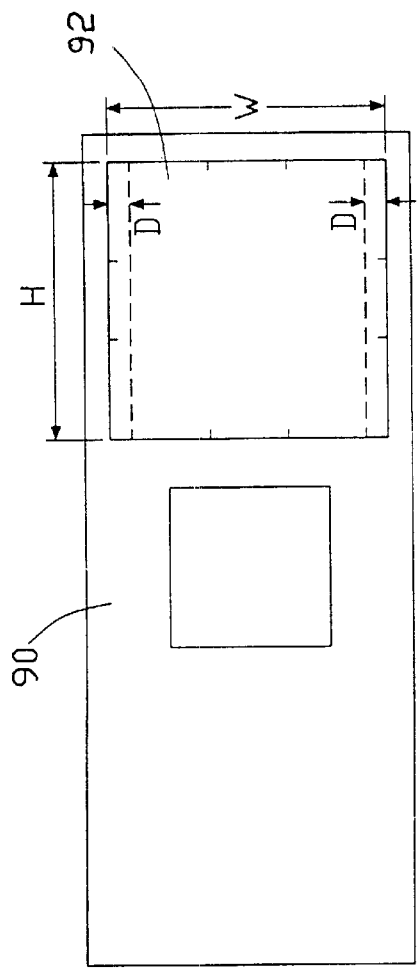
FIGS. 1A to 1C are schematic front views of conventional computer enclosures and a disk drive.
Figure 1C:
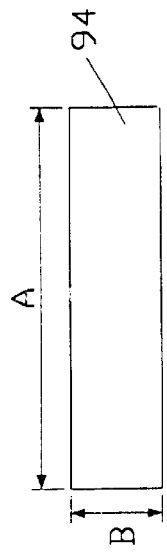
Figure 1A:
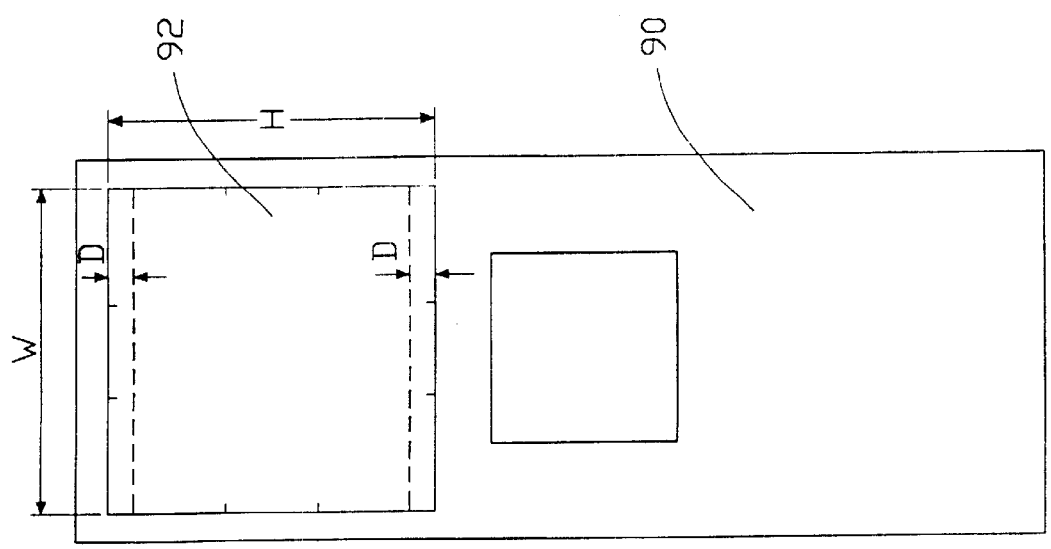
Figure 2:
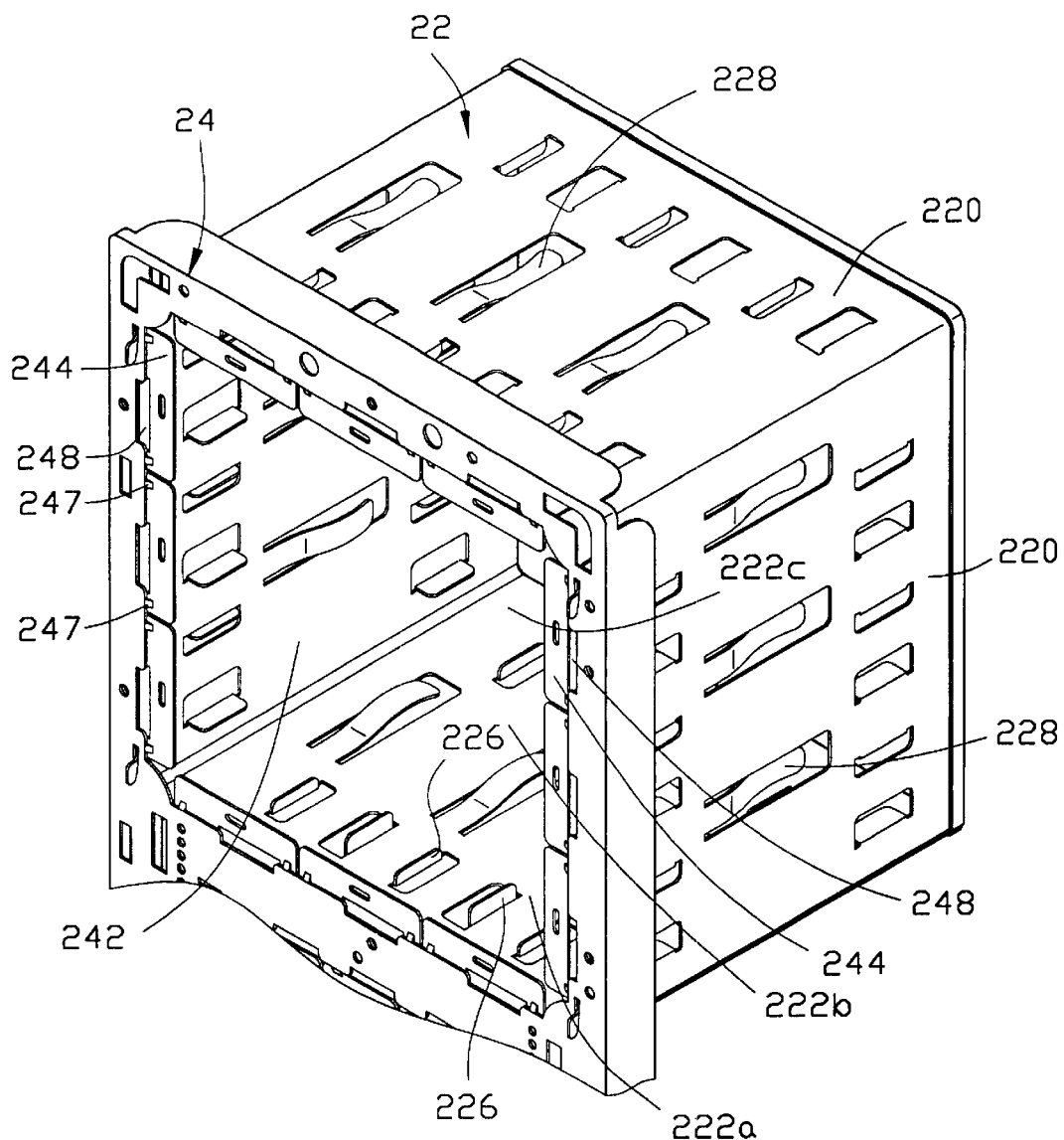
FIG. 2 is a partial perspective view of a disk drive cage assembly in accordance with the present invention.
Figure 3:
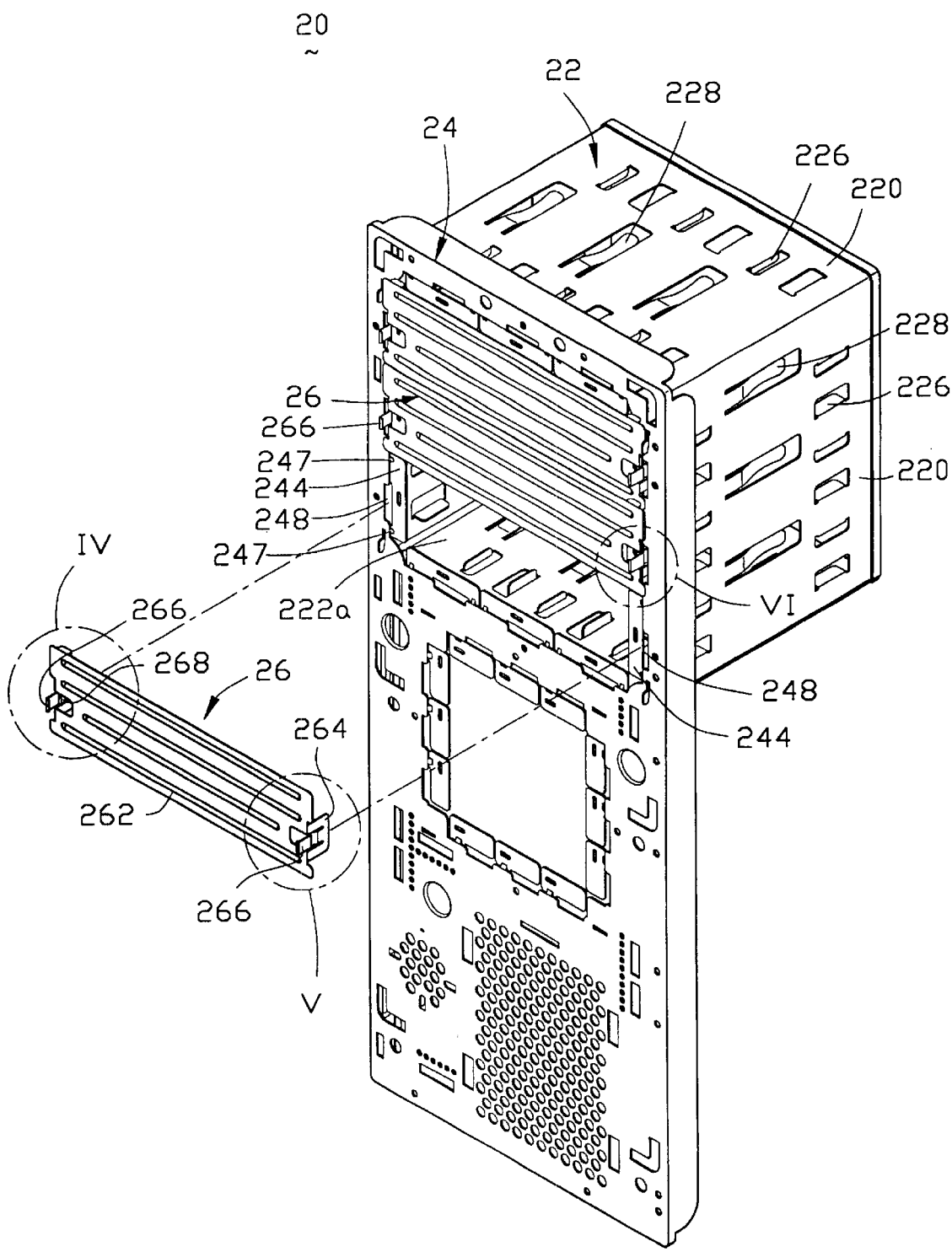
FIG. 3 is an exploded perspective view of the disk drive cage assembly including a cage, a front panel and shield members.

Referring to FIGS. 2–3, a disk drive cage assembly 20 according to the present invention comprises a cage 22, a front panel 24 and shield members 26. The cage 22 is made of metal sheet having four side walls 220 leaving the front and the back of the cage 22 open. Between a pair of opposite vertical side walls 220 of the cage 22 there are open bay for receiving a data storage device such as a disk drive for magnetic or optical disks, a tape backup drive, or the like. In the illustrated form, the four side walls 220 are arranged so that the cross-section of the cage 22 is substantially square sized to receive a plurality of industry standard width data storage devices stacked atop one another. Preferably, the cross-section is sized to receive up to three data storage devices stacked atop one another. Therefore, three bays 222a, 222b, 222c each for receiving a data storage device between each pair of opposite side walls 220 are defined. Each pair of opposite side walls 220 further forms a plurality of tabs 226 extending inwardly corresponding to the bays 222a, 222b, 222c for guiding data storage devices to slide therein. Between the tabs 226 grounding clips 228 are formed on the side walls 220 for contacting the data storage devices and thereby establishing conductive paths between the data storage devices and the cage 22.

The front panel 24 has a window 242 with the same cross-section as the cage 22 positioned before the cage 22 for accessing the bays 222a, 222b, 222c. The front panel 24 further forms pairs of protecting patches 244 and elongate holes 248 along the periphery of the window 242, each pair of the patches 244 and elongate holes 248 corresponding to a bay. The protecting patches 244 are joined to the periphery of the window 242 by particles 247 for facilitating removal of the protecting patches 244 to permit entrance of a data storage device into the cage 22. After the protecting patch 244 is removed, its corresponding hole 248 forms a nick in communication with the square window 242, allowing a rail mounted data storage device to slide into the cage 22 therethrough and to interferingly engage therewith.

In order to attenuate the emissions of electromagnetic radiation through the window 242, this invention contemplates that at least one manually removable shield member 26 will be mounted in the open bay. Preferably, and as illustrated, a plurality of such members 26 are provided where there are a plurality of bays. In the illustrated form, two of the three bays shown have corresponding shield members 26 mounted therein.

Reference is now made to the shield members 26 as shown in FIGS. 3–6. The shield member 26 may be placed in a bay where no data storage device is mounted. Each shield member 26 is formed of a thin sheet metal material such as stainless steel for being in electrical contact with the front panel 24. The shield member 26 has a generally rectangular planar portion 262 for fitting within the generally rectangular bay opening in order to prevent EMI relating to this bay. A pair of spring arms 264 is formed at opposite sides of the planar portion 262 and extends perpendicular to the planar portion 262 for inserting into corresponding elongate holes 248 of the front panel 24. Each spring arm 264 integrally defines a spanner 266 extending oppositely to the extension of the spring arm 264. The spanner 266 has a hook 268 in its inner side for engaging with the corresponding hole 248. When the shield member 26 is installed in a corresponding bay, as shown in FIG. 6, the spring arm 264 is inserted in the elongate hole 248 and the hook 268 interferingly engages with an inner surface of the protecting patch 244. As can be seen, the shield member 26 can be readily removed manually from the bay 222a (or 222b, 222c) by pulling the spanner 266 to loosen the engagement when a data storage device needs to be mounted therein.

Figure 7:
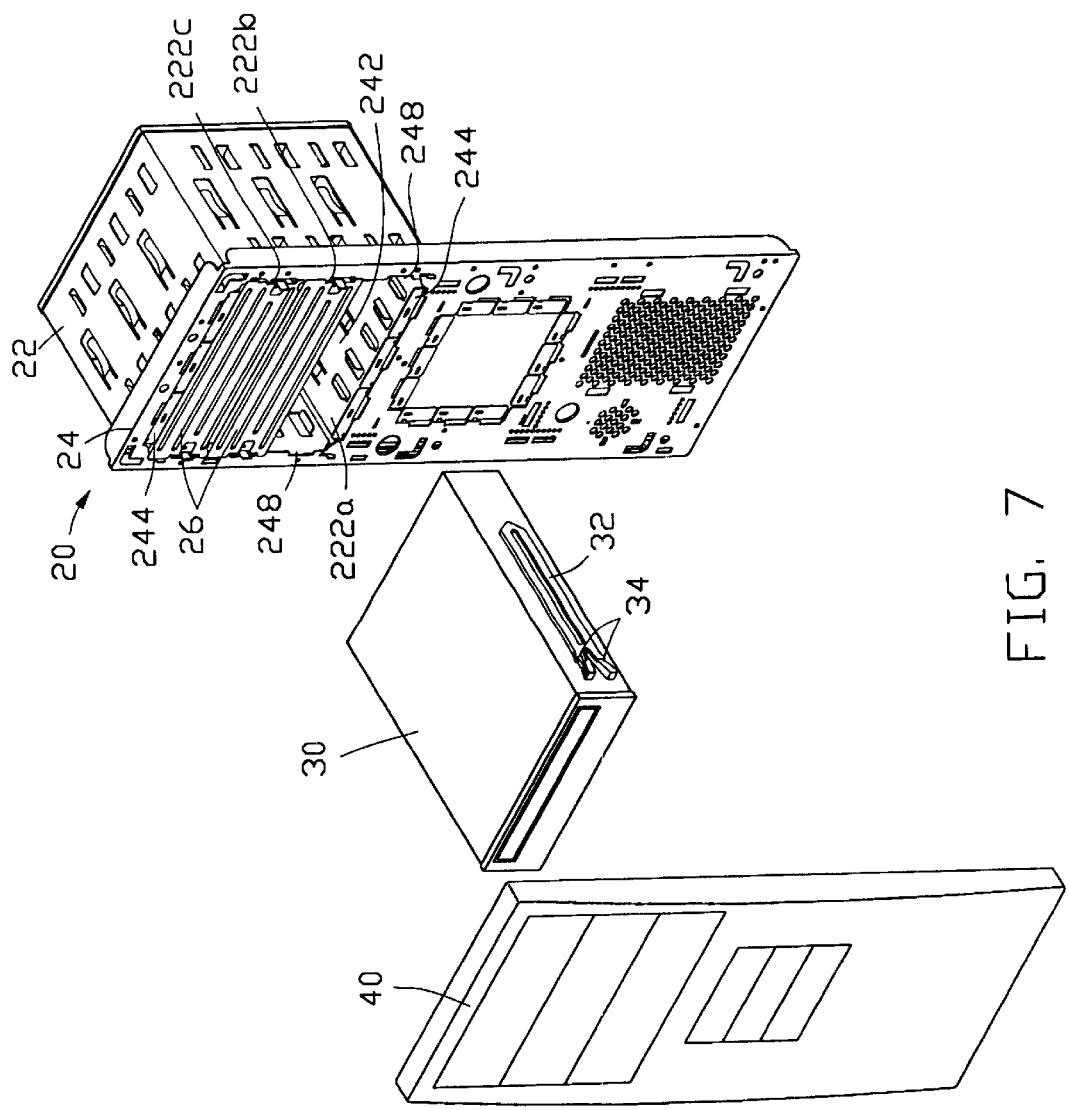
FIG. 7 is an exploded view of the disk drive cage assembly accommodating a vertical-type computer front bezel and a disk drive to be mounted therein.
Figure 8:
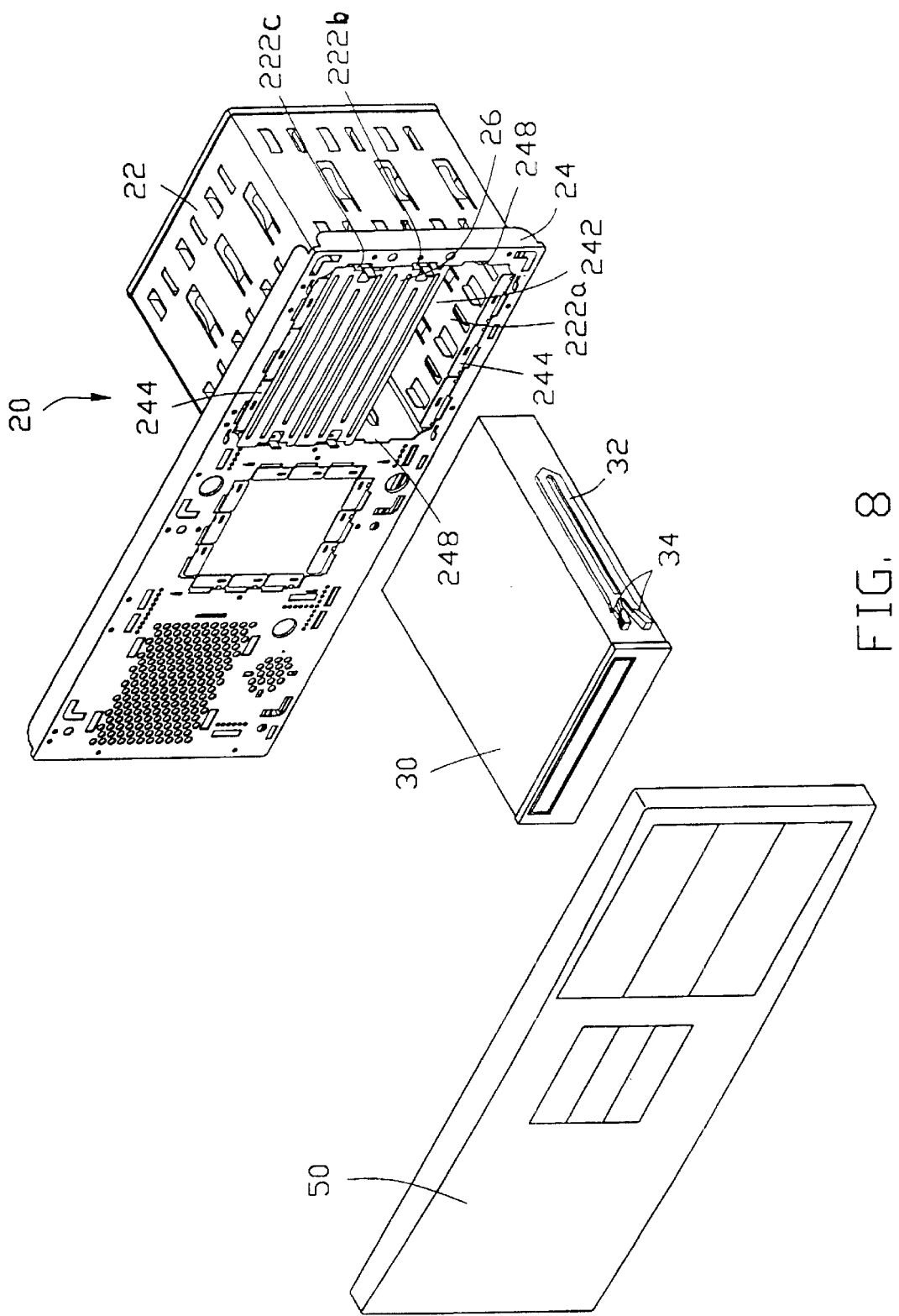
FIG. 8 is an exploded view of the disk drive cage assembly accommodating a horizontal-type computer front bezel and a disk drive to be mounted therein.

Note that the disk drive cage assembly 20 can be shared by vertical computer front bezels and horizontal computer front bezels and the cage 22 and the front panel 24 of the assembly 20 need not to be reassembled, because the window 242 of the front panel 24 is square and is sized according to the width of a commonly used drive such as a 3.5 inch drive or a 5.25 inch drive. Thus, the window 242 can accommodate three bays 222a, 222b and 222c at most, and there are still gaps at the upper and lower sides of the window 242. The protecting patches 244 are just sized for fitting within the gaps for decreasing EMI. FIGS. 7–8 illustrate how the disk drive cage assembly 20 accommodates computer front bezels and disk drives for embodying the present invention. To facilitate the description, the longer side of the front panel is designated as the lengthwise direction and the shorter as the widthwise direction. As FIG. 7 shows, when the disk drive cage assembly accommodates a vertical computer front bezel 40, the shield members 26 are mounted in the bays 222b and 222c in widthwise orientation. The protecting patches 244 at opposite sides of the bay 222a are first removed to receive a data storage device 30, the elongate holes 248 forming nicks in communication with the window 242 to provide an opening for opposite side rails 32 of the data storage device 30 to pass through and engage with protrusions 34 of the rails 32. The gaps at a top and bottom sides of the window 242 are shielded by widthwise side patches 244 as shown. When the disk drive cage assembly accommodates a horizontal computer front bezel 40, as is shown in FIG. 8, the shield members 26 are mounted in the bays 222b and 222c in lengthwise orientation and the protecting patches 244 at opposite sides of the bay 222a are first removed to receive a data storage device 30. The gaps at top and bottom sides of the window 242 are shielded by lengthwise side patches 244 as shown.

While the present invention has been described in reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. A disk drive cage assembly adapted to receive data storage devices, comprising:

a cage having four side walls with an opening extending in a front-to-back direction, each pair of opposite side walls forming a plurality of bays each for receiving a data storage device;

a front panel defining a square window positioned before the cage for accessing said bays and forming a plurality of pairs of removable protecting patches and holes along a periphery of the window, each pair of protecting patches and holes corresponding to one of said bays, the patches being designed to be selectively removed away from the front panel when the data storage device is received into said cage therethrough; and a plurality of shield members removably mounted to the front panel, each shield member having a pair of hooks spring arms engaging with the corresponding holes thereby mounting the shield members in said bays, the shield members collaborating with the protecting patches to attenuate emission of electromagnetic radiation therethrough.

2. The disk drive cage assembly as claimed in claim 1, wherein one or more particles are provided to connect the protecting patches to the window.

3. The disk drive cage assembly as claimed in claim 2, wherein the holes are spaced from the square window by corresponding protecting patches, and after the protecting patch is removed, the hole of the patch forms as a nick in communication with the window.

4. The disk drive cage assembly as claimed in claim 1, wherein a portion of each hooked spring arm integrally forms a spanner, a hook being defined in an inner side of the spanner.

5. The disk drive cage assembly as claimed in claim 1, wherein the shield member has a planar portion and the pair of hooked spring arms are formed at opposite sides of the planar portion and extend perpendicular to the planar portion for inserting into said holes.

6. The disk drive cage assembly as claimed in claim 5, wherein a portion of each hooked spring arm and the planar portion integrally define a spanner extending oppositely to the hooked spring arm with a hook being defined in an inner side of the spanner.

7. The disk drive cage assembly as claimed in claim 1, wherein the square window is sized according to a 5.25 inch drive.

8. The disk drive cage assembly as claimed in claim 1, wherein the square window is sized according to a 3.5 inch drive.

9. The disk drive cage assembly as claimed in claim 1, wherein an optimum number of the bays defined in the cage is three.

10. A disk drive cage assembly adapted to accommodate vertical computer front bezels and horizontal computer front bezels, comprising:

a cage having four side walls with an open front and back, each pair of opposite side walls forming a plurality of bays each for receiving a data storage device;

a front panel defining a square window positioned before the cage for accessing said bays and forming a plurality of pairs of removable protecting patches along a periphery of the window, each pair of protecting patches corresponding to one of said bays, the patches being designed to be selectively removed to permit entrance of the data storage device horizontally into said cage therethrough whether to accommodate a vertical computer front bezel or to accommodate a horizontal computer front bezel.

11. The disk drive cage assembly as claimed in claim 10, wherein one or more particles are provided to connect the protecting patches to the window.

12. The disk drive cage assembly as claimed in claim 10, wherein the square window is sized according to a 5.25 inch drive.

13. The disk drive cage assembly as claimed in claim 10, wherein the square window is sized according to a 3.5 inch drive.

14. The disk drive cage assembly as claimed in claim 10, wherein an optimum number of the bays is three.

15. A disk drive cage assembly, comprising:

a cage having at least one pair of side walls, opposite side walls of the cage forming at least one bay for receiving a data storage device;

a front panel connected to said cage, the front panel defining a window for accessing said bay and forming at least a pair of removable protecting patches and holes along a periphery of the window corresponding to said bay, the patches being designed able to be moved to provide an opening for the data storage device to pass through; and a manually removable shield member mounted in said bay and collaborating with the protecting patches to attenuate emission of electromagnetic radiation therethrough.

16. The disk drive cage assembly as claimed in claim 15, wherein one or more particles are provided to connect the protecting patches to the window.

17. The disk drive cage assembly as claimed in claim 15, wherein the shield member has a planar portion and a pair of hooked spring arms formed at opposite sides of the planar portion and extend perpendicular to the planar portion for inserting into said holes.

18. The disk drive cage assembly as claimed in claim 17, wherein each hooked spring arm integrally forms a spanner, a hook being defined in an inner side of the spanner and engaging with a corresponding protecting patch in a corresponding hole.

19. The disk drive cage assembly as claimed in claim 17, wherein a portion of each hooked spring arm and the planar portion integrally define a spanner extending oppositely to extension of the hooked spring arm and beyond the front panel, a hook being defined in an inner side of the spanner.

20. A disk drive cage assembly for receiving data storage devices therein, comprising:

a cage having four side walls with an opening extending in a front-to-back direction, the pair of opposite side walls in a first direction and the other pair of opposite side walls in a second direction, which is perpendicular to the first direction, respectively defining a plurality of bays for receiving the corresponding data storage devices in either first or second direction;

a front panel positioned in front of the cage, said front panel defining a window in alignment with the opening for accessing the bays; and plural pairs of removable protecting patches formed along a periphery of the window, each pair of protecting patches being aligned with the corresponding bay; wherein the data storage devices are horizontally installed into the corresponding bays, respectively, and the pairs of protecting patches, which are aligned with the corresponding bays in the first direction, are removed to permit entrance of the corresponding data storage devices for cooperation with a vertical computer front panel, while the pairs of the protecting patches, which are aligned with the corresponding bays in the second direction, are removed to permit entrance of the corresponding data storage devices for cooperation with a horizontal computer front panel.

* * * * *